United States Patent
Sargaison

(10) Patent No.: US 7,418,103 B2
(45) Date of Patent: Aug. 26, 2008

(54) SYSTEM AND METHOD FOR CONTROLLING STATES OF A DEVICE

(75) Inventor: Stewart Sargaison, Foster City, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 309 days.

(21) Appl. No.: 10/913,066

(22) Filed: Aug. 6, 2004

(65) Prior Publication Data

US 2006/0029234 A1     Feb. 9, 2006

(51) Int. Cl.
    H04R 1/10     (2006.01)
(52) U.S. Cl. ................ 381/74; 381/370; 381/72; 381/371; 381/384
(58) Field of Classification Search ......... 381/370–371, 381/74, 309, 384, 68, 72, 1, 11; 439/620; 455/280
    See application file for complete search history.

(56) References Cited

U.S. PATENT DOCUMENTS

| | | | | |
|---|---|---|---|---|
| 4,955,729 A | * | 9/1990 | Marx | 381/322 |
| 5,144,678 A | * | 9/1992 | Lenz | 381/384 |
| 5,473,676 A | * | 12/1995 | Frick et al. | 379/93.09 |
| 6,035,047 A | * | 3/2000 | Lewis | 381/72 |
| 6,069,960 A | * | 5/2000 | Mizukami et al. | 381/74 |
| 6,704,428 B1 | * | 3/2004 | Wurtz | 381/370 |
| 6,985,592 B1 | * | 1/2006 | Ban et al. | 381/74 |
| 7,010,332 B1 | * | 3/2006 | Irvin et al. | 455/575.2 |
| 2004/0042629 A1 | * | 3/2004 | Mellone et al. | 381/310 |
| 2004/0258253 A1 | * | 12/2004 | Wurtz | 381/71.6 |
| 2005/0201568 A1 | * | 9/2005 | Goyal | 381/74 |
| 2006/0215847 A1 | * | 9/2006 | Hollemans et al. | 381/74 |

FOREIGN PATENT DOCUMENTS

EP      1 199 867 A1      4/2002

* cited by examiner

Primary Examiner—Vivian Chin
Assistant Examiner—Disler Paul
(74) Attorney, Agent, or Firm—Carr & Ferrell LLP

(57) ABSTRACT

A system and method for automatically changing a state of a device coupled to a headphone device is provided. The system comprises a means for detecting if at least one earpiece of the headphone device is activated or deactivated. Based on an activation state or a change in an activation state of the at least one earpiece, a state change may occur in the device. The state change is determined by a preset of a control module.

24 Claims, 6 Drawing Sheets

| CURRENT STATE | 1 EARPIECE REMOVED STATE | BOTH EARPIECES REMOVED STATE | NO EARPIECES REMOVED STATE |
|---|---|---|---|
| Run | Pause<br>Volume Adjust<br>Fast Forward<br>Reverse | Pause<br>Power Save | ✕<br>(Stay in Run) |
| Pause | Power Save<br>(after x time) | Power Save | Run |
| Power Save | Run | ✕<br>(Stay in Power Save) | Run |

FIG. 6

SYSTEM AND METHOD FOR CONTROLLING STATES OF A DEVICE

BACKGROUND OF THE INVENTION

1. Field of the Invention

The present invention relates generally to portable devices having headphones, and more particularly to state changes in the portable devices.

2. Description of Related Art

Many portable consumer devices utilize a headphone in order to provide private and personalized audio to a user. In a stereo embodiment, these headphones typically include a right earpiece and a left earpiece coupled to a right and left channel of audio, respectively. Alternatively, the right and left earpieces may share a single channel of audio.

Conventionally, state changes in a portable device, such as a MP3 player or cell phone, must be manually initiated by a user. For example, if the user needs to place the device into a pause mode from a play mode, the user, typically, will need to physically access the device and make a selection (e.g., push a pause button) to pause the device. This may be troublesome when, for example, the device is located in a place that is hard to reach (e.g., deep in a pocket), the user only has a single hand or no hands free (e.g., holding items in both hands), or the user cannot safely access the device (e.g., while driving a car).

In alternative embodiments, the user may need to find a remote of the device and make a selection on the remote in order to change the state. Disadvantageously, this embodiment requires the user to physically locate and operate on the remote device in order to enable state changes.

Therefore, there is a need for a system and method for automatically changing states of a device without having to the physically access the device.

SUMMARY OF THE INVENTION

The present invention provides a system and method for automatically changing a state of a device coupled to a headphone device based on activation states of earpieces of the headphone device. The system of the present invention comprises a means for detecting if at least one earpiece of the headphone device is activated or deactivated (i.e., an activation state). The means for detecting, in exemplary embodiments, may be an amplifier, a micro-switch, or a thermo sensor. In the case where the means for detecting is an amplifier, the amplifier located within the device detects impedance or impedance changes. The impedance will change when a micro-switch located in the earpiece is opened (i.e., earpiece is not in or against the ear, and thus no audio signal is traveling to the earpiece) from a closed state (i.e., earpiece is in or against the ear, and thus an audio signal is traveling to the earpiece) or vice-versa. Based on a change in the activation state of the at least one earpiece, a state change may occur in the device. The state change is determined by a preset of a control module.

In an alternative embodiment, a sensor in each earpiece detects the activation state (or activation state change) and generates a corresponding signal. This signal is sent to the device where a control module will determine if a device state change is needed. In further embodiments, the sensor is a thermo sensor which detects a temperature change when an earpiece is inserted or placed against an ear and when the same earpiece is removed from the ear.

The method of the present invention comprises detecting an activation state or a change in activation state of at least one earpiece of the headphone device. A change in activation state may, in exemplary embodiments, be detected by monitoring impedance changes to each earpiece, by monitoring an opening or closing of a micro-switch within the earpiece, or by monitoring a temperature change in the earpiece. If a change is detected, the device determines a state change, if one is needed, for the device based the change in activation state and on a preset. The preset may be manufacturer supplied or configured by a user. The device then implements the preset state change.

BRIEF DESCRIPTION OF THE DRAWINGS

FIG. 6 is a table illustrating possible state changes from a current state, according to exemplary embodiments of the present invention.

DETAILED DESCRIPTION OF EXEMPLARY EMBODIMENTS

Figure 1:
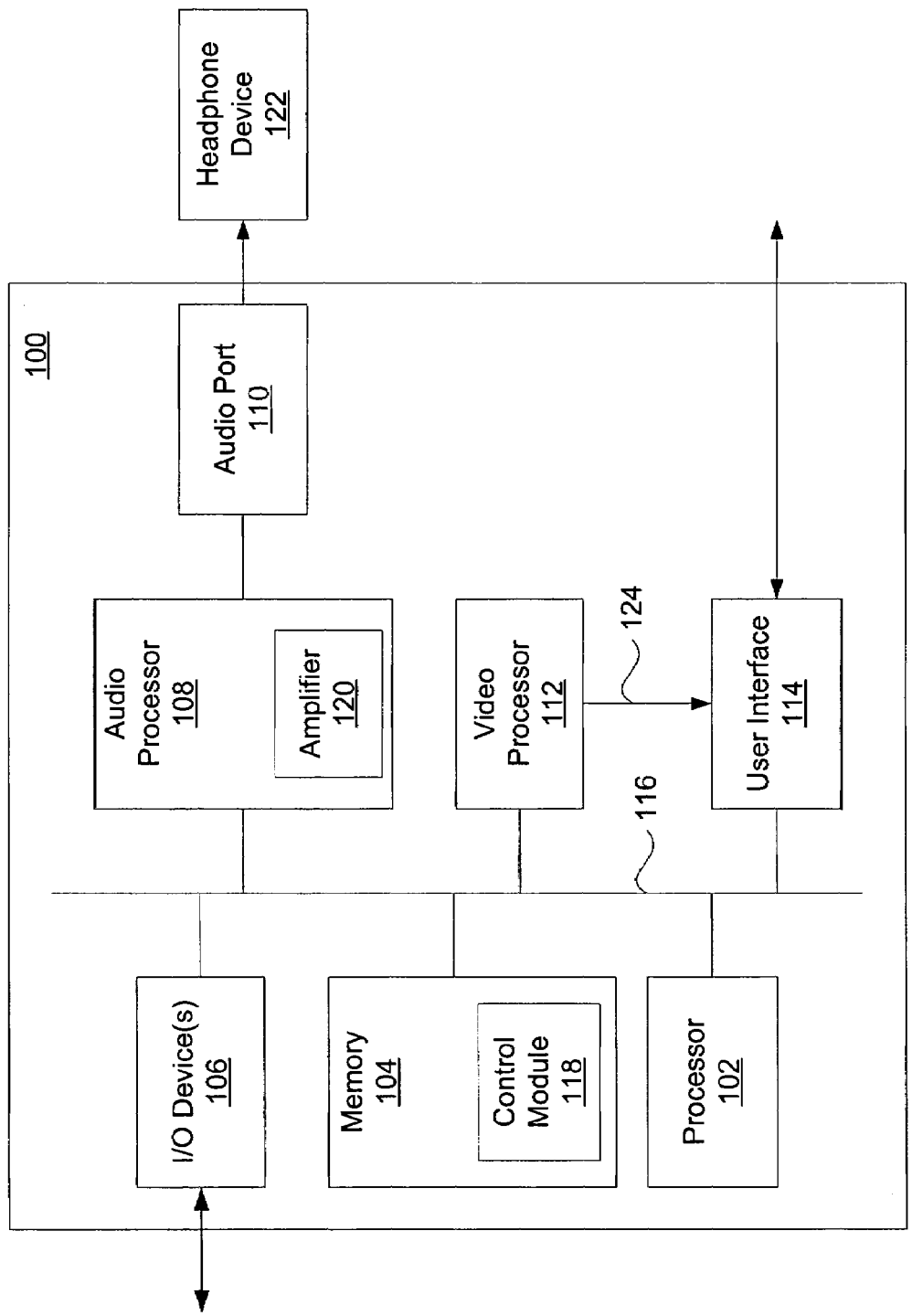
FIG. 1. is an exemplary embodiment of a system for controlling states of a device.

FIG. 1. shows an exemplary embodiment of a device 100 configured for automated state changes. The device 100 may be any handheld or portable device which utilizes a headphone. Alternatively, the device 100 may be a non-portable device utilizing headphones (e.g., a home stereo system). The device 100 comprises a processor 102, a memory 104, at least one input/output device 106, an audio processor 108 coupled to an audio port 110, a video processor 112, and a user interface 114 all coupled via a bus 116. Alternative embodiments of the device 100 may comprise more, less, or other components. For example, if the device 100 is a compact disc player, the video processor 112 may not be necessary.

The I/O device 106 allows the user to input audio data and, in some embodiments, video data into the device 100 from an external source. For example, the I/O device 106 may be a disc drive capable of reading data from a compact disc (CD) or digital video disc (DVD). Alternatively, the I/O device 106 may be an interface for downloading of audio and video data from a digital source (e.g., downloading audio from the Internet). Numerous other I/O devices 106 are contemplated and known to those skilled in the art.

In some embodiments, digital audio and video data loaded into the device 100 may be stored in the memory 104. Alternatively, a separate database (not shown) may be provided within the device 100 for storing the digital data.

The memory 104 further comprises a control module 118. The control module 118 controls states of the device 100. For example, if the device 100 is a portable audio or video device, the states of the device 100 may include play, stop, pause, reverse, and forward. Thus, when a user activates one of the states through the user interface 114 (e.g., presses the "play" button), the control module 118, in exemplary embodiments, sends instructions to the processor 102 to enable play of audio and/or video. In alternative embodiments, the control module 118 may be located elsewhere in the device 100.

The audio processor 108 processes the digital audio data received from the I/O device 106, the memory 114, or the optional database for output to the user. In exemplary embodiments, the audio processor 108 will convert the digital audio data into analog signals. In further embodiments, these analog signals are amplified by an amplifier 120 before being transmitted through the audio port 110 to a coupled headphone device 122.

Similarly, the video processor 112 processes the digital video data received from the I/O device 106, the memory 114, or the optional database for output to the user. In the present embodiment, video output is through the user interface 114, which may comprise, for example, a touch-sensitive display screen. In alternative embodiments, the video processor 112 may be coupled to a monitor or similar display device. A dedicated line 124 may, in some embodiments, be provided for transfer of the processed video data from the video processor 112 to the user interface 114.

In the embodiment of FIG. 1, the device 100 determines whether one or both earpieces of the headphone device 122 are activated by monitoring each earpiece (i.e., a right earpiece and a left earpiece) relative to the user's ear. For example, if the headphone device 122 is an earbud type headphone, the device determines if one or both earbuds are in the ear (i.e., activated). Alternatively, if the headphone device 122 is an over-the-ear type, the device determines if one or both earpieces are positioned against the ear.

Based on results of the determination, the device 100 may alter its state or behavior based upon user set preferences. For example, if the device 100 is a portable audio device (e.g., MP3 player), removing one earpiece may trigger a behavior that halves volume to the other earpiece still activated. This user preference may be set on an assumption that the user removes the earpiece to listen to another person speaking, thus reducing the volume in the remaining earpiece is useful. In a further embodiment, if the user removes both earpieces, then the device 100 may enter a "pause" state or behavior. If within a certain amount of time, the user reactivates one or both of the earpieces, then the device 100 may resume play, otherwise, the device 100 may enter a "shut down" state. Exemplary state changes will be discussed in more detail in connection with FIG. 6.

In the embodiment of FIG. 1, the device 100 determines whether the earpiece is activated by monitoring impedance and/or changes in impedance of each earpiece. In exemplary embodiments, each earpiece of the headphone device 122 comprises a micro-switch. The micro-switch automatically closes upon insertion of the earpiece into or against the ear. When the micro-switch is closed, the earpiece will draw current, resulting in a low impedance. However, when the micro-switch is opened (i.e., the earpiece is removed from the ear), the earpiece will not draw current, thus resulting in a high impedance. The current draw, impedance change, or impedance state (i.e., high or low), in exemplary embodiments, are detected by the amplifier 120. Once detected, the audio processor 108 forwards the data to the processor 102, which in turn may request the control module 118 to determine a device state change based on the user set preferences. In alternative embodiments, other circuitry in the device 100 may detect the current draw or impedance change.

In exemplary embodiments, the current, impedance, and/or impedance change is constantly monitored. Alternatively, the changes may be monitored periodically. In some embodiments, the signals (i.e., activation state change signals) are only generated when an activation state change occurs, while in other embodiments, the signals (i.e., activation state signals) are generated at a preset time period. In a further embodiment, other circuitry or another device may monitor or detect the current, impedance, and/or impedance change.

Figure 2:
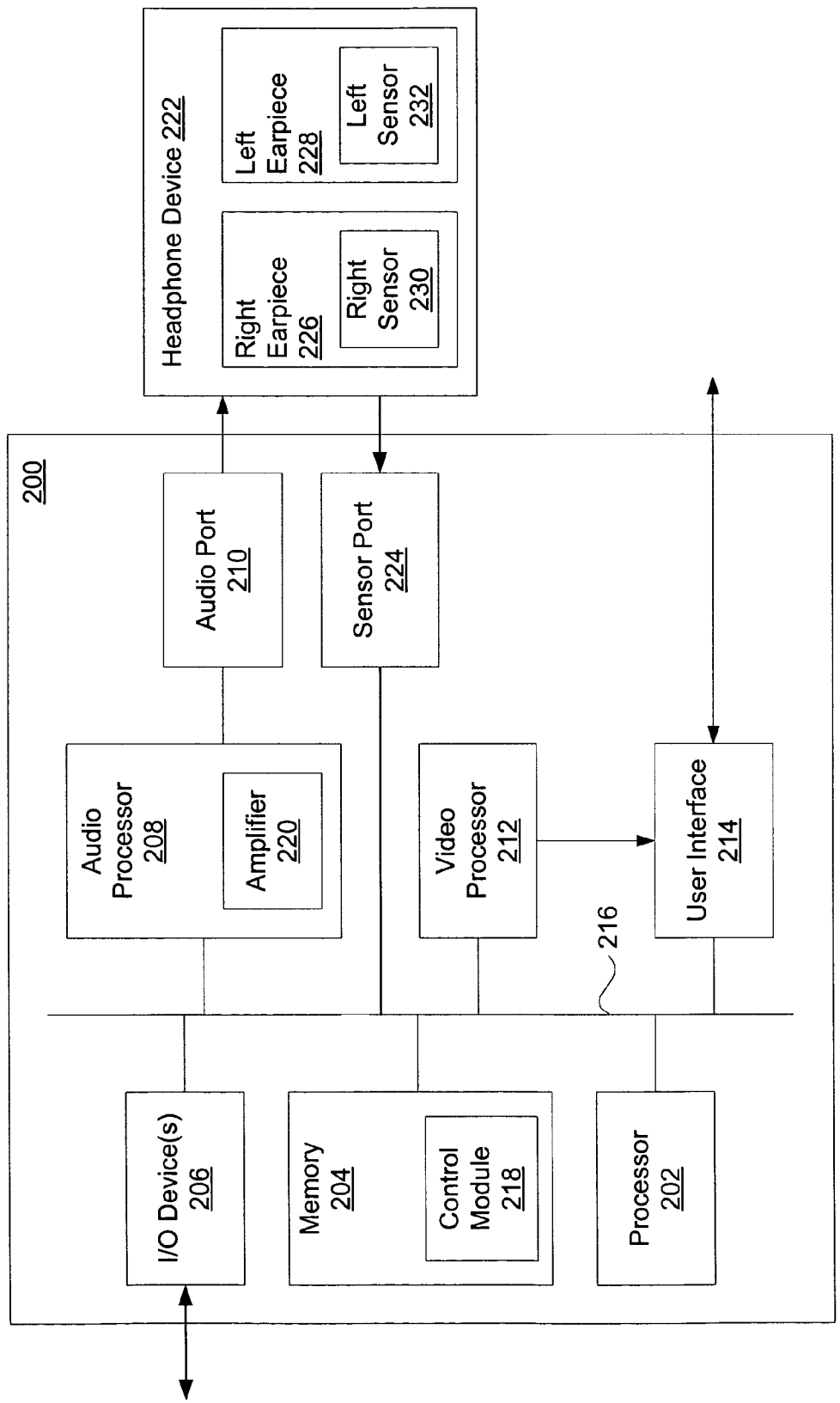
FIG. 2 is an alternative embodiment of a system for controlling states of a device.

Referring now to FIG. 2, an alternative embodiment of a device 200 configured for automated state changes is shown. The embodiment of FIG. 2 comprises similar elements as that of FIG. 1 including a processor 202, a memory 204, at least one input/output device 206, an audio processor 208 coupled to an audio port 210, a video processor 212, and a user interface 214 all coupled in communication via a bus 216. Similarly, the memory comprises a control module 218, and the audio processor 208 comprises an amplifier 220. The audio processor 208 processes audio data and sends the processed analog audio signals to a headphone device 222 via the audio port 210.

However, in the embodiment of FIG. 2, determination of whether one or both earpieces are activated is performed at the headphone device 222. Signals representing activation states or activation state changes in one or both of the earpieces (i.e., right earpiece 226 and left earpiece 228) of the headphone device 222 are then sent to a sensor port 224, which essentially acts as a signal-in-port on the device 100. The signals are then routed to the processor 202 and/or the control module 218. In one embodiment, the headphone device is wireless and signals are transmitted in a wireless manner (e.g., infrared or radio frequency).

According to one embodiment, a state or state change signal is generated indicating if a micro-switch of one or both earpieces is open (i.e., activated) or closed (i.e., deactivated). In exemplary embodiments, a right sensor 230 of the right earpiece 226 and a left sensor 232 of the left earpiece 228 generate the activation state or activation state change signals. Furthermore, embodiments of the right and left sensors 230 and 232 may comprise the micro-switch in each earpiece. Thus, when the earpiece is inserted in, or positioned next to, the user's ear, the micro-switch will close. However, when the earpiece is removed from the ear, the micro-switch will open. When the micro-switch opens or closes, circuitry in the headphone device 222 will sense the activation state or activation state change. For example, the circuitry may sense a change in voltage draw or impedance associated with one of the earpieces. The circuitry will then generate the activation state change signal. In some embodiments, the signals (i.e., activation state change signals) are only generated when an activation state change occurs, while in other embodiments, the signals (i.e., activation state signals) are generated at a preset time period.

In an alternative embodiment, the headphone device may generate an activation state or activation state change signal when circuitry within the earpiece senses a temperature change. In this embodiment, the sensors 230 and 232 are thermal sensors. Because the ear is typically at a higher temperature than an environment that the headphone device 222 is used within, inserting the earpiece into, or positioning the earpiece against, the ear will cause a temperature change (i.e., increased temperature) in at least a portion of the earpiece that is detectable by the sensor 230 or 232. Similarly, removal of the earpiece will cause a temperature drop that is detected by the sensor 230 or 232. Temperature changes cause the circuitry in the headphone device to generate and send the activation state or activation state change signal to the sensor port 224 in the device 200. In a further embodiment, the sensor 230 or 232 may be replaced by a skin-resistance sensor. Thus, when the earpiece is placed in or against the ear, the skin-resistance sensor senses a change which causes the generation of the activation state change signal. In some embodiments, the signals (i.e., activation state change signals) are only generated when an activation state change occurs, while in other embodiments, the signals (i.e., activation state signals) are generated at a preset time period.

Although FIG. 2 shows the right and left sensors 230 and 232 contained within the right and left earpiece 226 and 228, respectively, alternative embodiments may comprise the right and left sensors 230 and 232 located elsewhere in the headphone device 222. In these embodiments, the right and left sensors 230 and 232 are coupled to the right and left earpieces 226 and 228, respectively. In a further embodiment, a single sensor may be coupled to both the right and left earpieces 226 and 228 for monitoring the activation of both earpieces.

Figure 3:
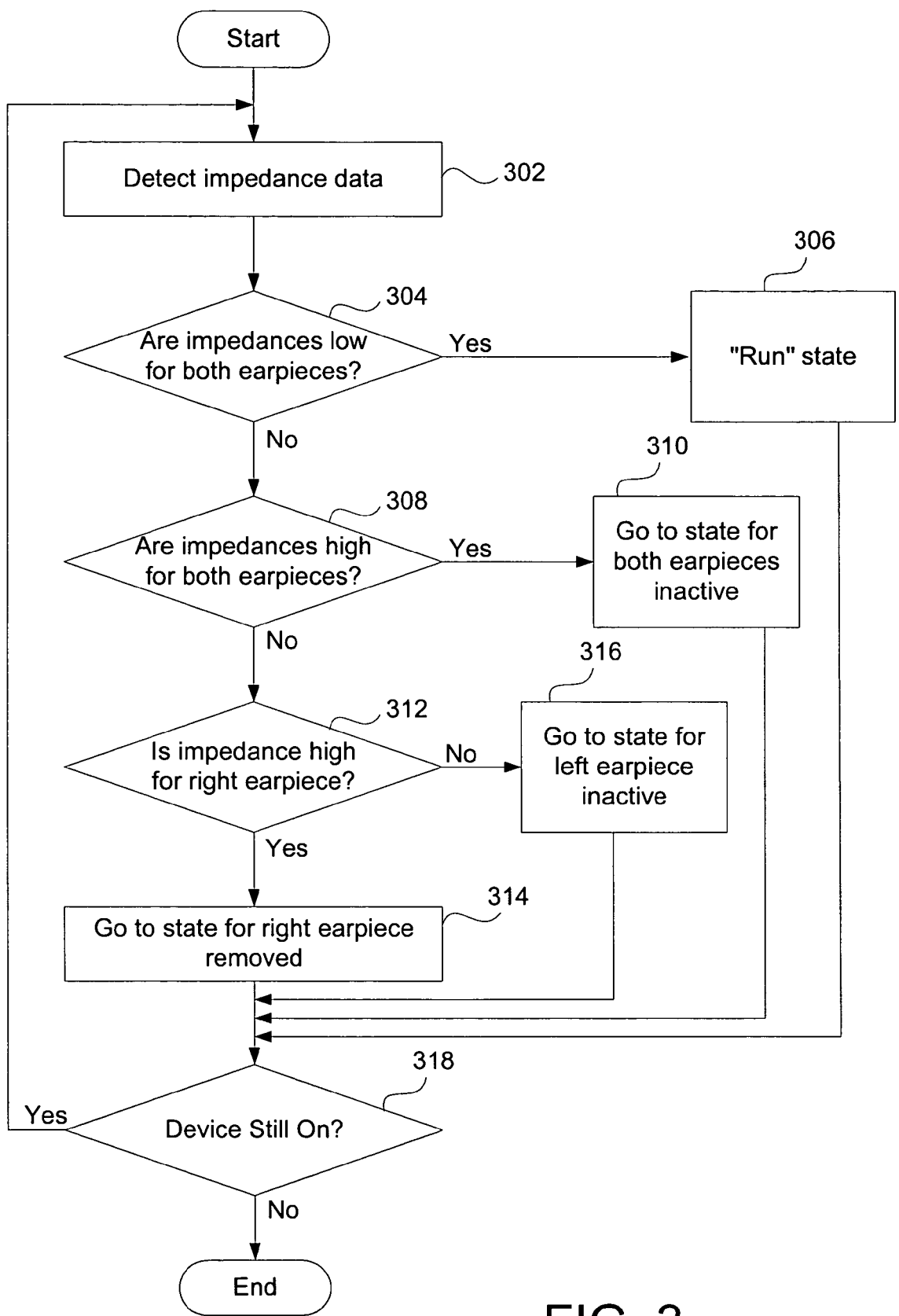
FIG. 3 is a flowchart for controlling states in accordance with the embodiment of FIG. 1.

FIG. 3 is a flowchart 300 of an exemplary method for controlling states of a device in accordance with the embodiment of FIG. 1. In step 302, the amplifier 120 (FIG. 1) detects impedance from a circuit supplying voltage and current to each earpiece of the headphone device 122 (FIG. 1). If the micro-switch in the earpiece is open (i.e., the earpiece is not positioned in or against the ear), no current is drawn, thus the impedance is high. However, if the micro-switch in the earpiece is closed (i.e., the earpiece is positioned in or against the ear), current is being drawn, and the impedance will be low. Thus, in step 304, the processor 102 (FIG. 1) determines if the impedance detected by the amplifier 120 is low for both earpieces. If the impedances are low, the processor 102 instructs the control module 118 (FIG. 1) to place or keep the device 100 in the "play" device state or mode in step 306.

However, if in step 304, the processor 102 determines that impedance is not low for both earpieces, the processor 102 checks if impedance is high for both earpieces in step 308. If impedance is high for both earpieces, then the control module 118 will place the device 100 into a predetermined (i.e., preset or user preference) device state for when both earpieces are deactivated (i.e., removed from the ear) in step 310.

If in step 308, impedances are not high for both earpieces, then in step 312, the processor 102 determines if the impedance is high for the right earpiece. If the right earpiece is high in impedance, the control module 118 will go to a predetermined device state for when the right earpiece is deactivated in step 314. Alternatively, if the impedance is not high for the right earpiece, the control module 118 will go to a predetermined state for when the left earpiece is deactivated in step 316.

If the device 100 remains on in step 318, then the method returns to monitoring the impedance data in step 302. However, if the device 100 turns off, then the method ends. In exemplary embodiments, the monitoring process may be continuous. Alternatively, the device 100 may monitor at set periods. These set periods may be defined by the manufacturer or by the user.

It should be noted that FIG. 3 illustrates only one embodiment of the method for controlling states in the device 100. Alternative embodiments may comprise more, less, or similar steps which accomplish the same results. For example, step 312 may determine if impedance is high for a left earpiece instead of for a right earpiece. Alternatively, the device 100 may require the processor 202 to determine which of the earpieces has either a high or a low impedance. In a further example, steps 304, 308, and 312 may be embodied within one step of the processor 102. This single step comprises detecting impedance strength or change in impedance for each of the earpieces.

Figure 4:
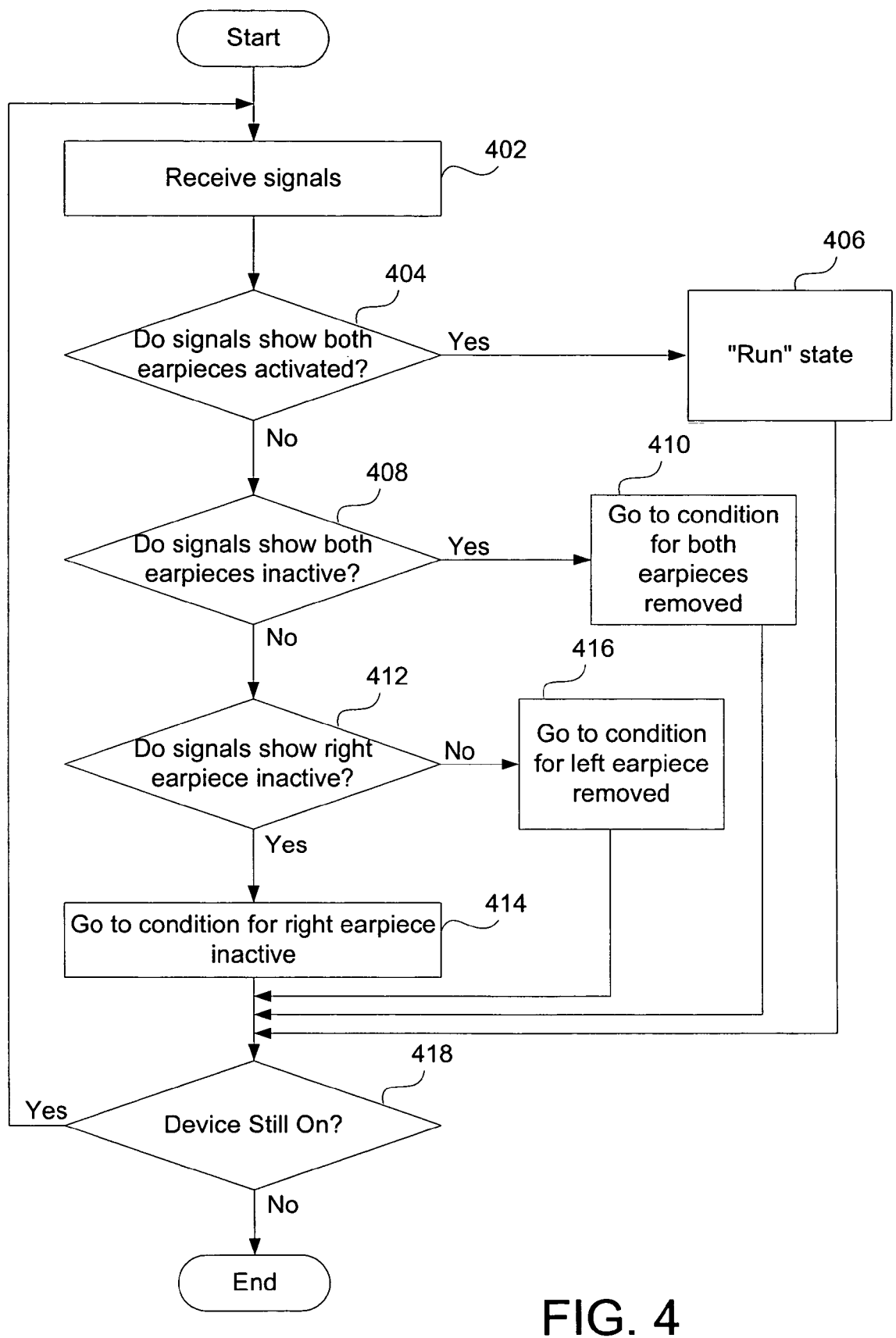
FIG. 4 is a flowchart for controlling states in accordance with the embodiment of FIG. 2.

Referring now to FIG. 4, a flowchart 400 of an exemplary method for controlling states according to the embodiment of FIG. 2 is shown. In step 402, the sensor 224 port (FIG. 2) receives state signals from the headphone device 222 (FIG. 2) and forwards the signals to the processor 202 (FIG. 2). These state signals indicate whether one or both of the earpieces of the headphone device 222 are activated. In one embodiment, the earpieces comprise a thermo sensor which senses temperature changes (i.e., when the earpiece is inserted, temperature is high, and when the earpiece is removed, the temperature is low), and triggers the generation of the state signals accordingly. In alternative embodiments, the earpieces may comprise skin-resistance sensors. In yet further embodiments, other circuitry associated with the earpieces may sense impedance changes for each earpiece.

Thus, in step 404, the processor 202 determines if the state signal shows both earpieces activated. If both earpieces are activated (i.e., inserted in the ears), the processor 202 instructs the control module 218 (FIG. 2) to place or keep the device 200 in the "play" state or mode in step 406.

However, if in step 404, the processor 202 determines that both earpieces are not activated, the processor 202 checks if both earpieces are deactivated in step 408. If both earpieces are deactivated (i.e., removed from the ears), then the control module 218 will place the device 200 into a predetermined (i.e., preset or user preference) device state for when both earpieces are deactivated in step 410.

If in step 408, both earpieces are not deactivated, then in step 412, the processor 202 determines if the right earpiece is deactivated. If the right earpiece is deactivated, the control module 218 will go to a predetermined device state for when the right earpiece is deactivated in step 414. Alternatively, if the right earpiece is activated, the control module 218 will go to a predetermined device state for when the left earpiece is deactivated in step 416.

If the device 200 remains on in step 418, then the method returns to receiving state signals in step 402. However, if the device 200 turns off, then the method ends.

It should be noted that FIG. 4 illustrates only one embodiment of the method for controlling states in the device 200. Alternative embodiments may comprise more, less, or similar steps which accomplish the same results. For example, step 412 may determine if the left earpiece is activated instead of the right. Alternatively, the device 200 may require the processor 202 to determine which of the earpieces are activated or deactivated. In a further example, steps 404, 408, and 412 may be embodied within one step of the processor 202. This single step comprises determining which earpieces are activated or deactivated based on the received state signals.

Figure 5:
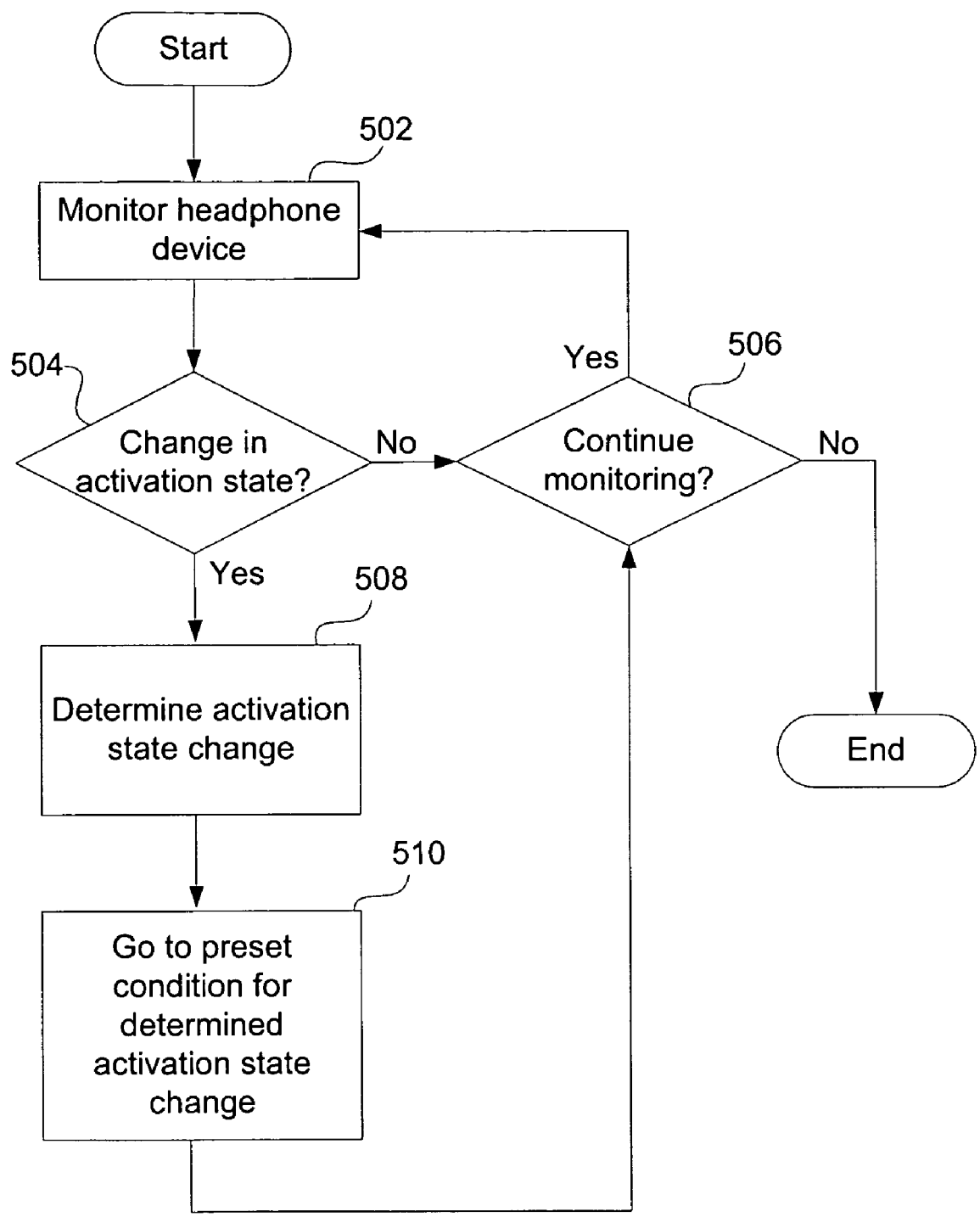
FIG. 5 is a flowchart of an alternative method for controlling states according to embodiments of the present invention.

Referring now to FIG. 5, an alternative method for controlling device states is shown. In step 502, the device 100 (FIG. 1) or 200 (FIG. 2) monitors the headphone device 122 (FIG. 1) or 222 (FIG. 2). In accordance to the embodiment of FIG. 1, the amplifier 120 (FIG. 1) or similar component of the device 100 monitors and detects current or impendence data for each earpiece of the headphone device 122 (FIG. 1). With respect to the embodiment of FIG. 2, the device 200 receives signals from the headphone device 222 (FIG. 2) at a sensor port 224 (FIG. 2). The signals are generated by sensors 230 and 232 (FIG. 2) in the headphone device 222, and may represent an activation/deactivation state of each earpiece 226 and 228 (FIG. 2) or a change in the activation/deactivation state.

Based on the data received while monitoring the headphone device 122 or 222, the device 100 or 200 determines if a change in the activation state has occurred in step 504. This determination may occur in the processor 102 (FIG. 1) or 202 (FIG. 2) or other component of the device 100 or 200. Thus, the device 100 or 200 determines if, for example, the impedance changed for one of the earpieces. If no change in activation state is present, then the device 100 or 200 determines if the monitoring process should continue in step 506. If, for example, the device 100 or 200 turns off, then the monitoring process should end. However, if the device 100 or 200 determines that the monitoring process should continue, then the method returns to step 502. The monitoring process may occur continuously or periodically depending on presets of the device 100 or 200.

If an activation state change is detected in step 504, then the device 100 or 200 determines what activation state change occurred. For example, the device 200 may receive an activation state change signal that indicates that the right earpiece 226 is removed from the ear. Alternatively, the device 100 may determine that the impedance is now high to the right earpiece of the headphone device 122, thus indicating that the right earpiece is no longer activated.

Based on the activation state change determined in step 508, the device 100 or 200 will change the device state accordingly. Thus is step 510, the device 100 or 200 will review presets in the control module 118 (FIG. 1) or 218 (FIG. 2) to determine what the device state should be, then implement the device state change if necessary. Subsequently, the device 100 or 200 determines if the monitoring process should continue in step 506.

Referring now to FIG. 6, a table illustrating possible states and state changes from a current state according to exemplary embodiments of the present invention is shown. The device states are predetermined or preset in the device 100 (FIG. 1) or 200 (FIG. 2). The user may set their own preset preferences, or alternatively, presets may be enabled by the manufacturer, which may be changed by the user. In alternative embodiments, other states may be utilized in addition to, or instead, of those shown. For example, alterative device states may comprise adjusting the bass, adjusting the tremble, changing audio balance in the earpieces (e.g., if the right earpiece is removed, all audio is shifted over to the left earpiece), and so forth.

If the current state is "run" or "play" and one earpiece is removed, then depending on the preset, the device 100 or 200 may enter a pause, adjust volumes, fast forward, or reverse state, for example. In one embodiment, the preset may be different for each earpiece. For example, the preset may send the device 100 or 200 into a "fast forward" state if the right earpiece is removed, and send the device 100 or 200 into a "reverse" state if the left earpiece is removed. In an alternative embodiment, the preset enables the same state change to occur when either of the earpieces is removed.

From the current "run" state, the removal of both earpieces may cause the device 100 or 200 to enter a "pause" state or a "power save" state. The "power save" state may, in exemplary embodiments, place the device 100 or 200 into a "standby" mode where a display or monitor darkens and components of the device 100 or 200 power down. In a further embodiment, the removal of both earpieces may turn off the device 100 or 200.

If the current state is a "pause" state caused by the removal of one or both earpieces, the device 100 or 200 may enter the "power save" state after a preset amount of time spent in the "pause" state. For example, the user may remove one earpiece to answer a phone call, if after 2 minutes (time interval being another present) the earpiece is not activated, then the device 100 or 200 will enter the "power save" state. Similarly, if the device 100 is in a "pause" state cause by the removal of both earpieces and after a preset amount of time, at least one earpiece is not activated, the device 100 or 200 may enter the "power save" state.

In an alternative preset, if the device 100 or 200 is in a "pause state" caused by one earpiece being inactive, the removal of the second earpiece will place the device 100 or 200 into the "power save" state. In yet a further embodiment, the removal of the second earpiece may cause the device 100 or 200 to shut down.

If both earpieces are activated from a current "pause" state, the device 100 or 200 will enter the "run" state.

If the current device state of the device 100 or 200 is a "power save" state caused by having both earpieces removed, the activation of one or both earpieces will cause the device 100 or 200 to enter the "run" state. Similarly, if the device 100 or 200 is in a "power save" state caused by the removal of one earpiece, the activation of the removed earpiece will cause the device 100 or 200 to enter the "run" state.

Although FIG. 6 shows that in the "power save" state, the removal of both earpieces maintains the state, an alternative embodiment may place the device 100 or 200 into a "shut off" state.

The present invention has been described above with references to exemplary embodiments. It will be apparent to those skilled in the art that various modifications may be made and other embodiments can be used without departing from the broader scope of the present invention. Therefore, these and other variations upon the specific embodiments are intended to be covered by the present invention.

What is claimed is:

1. A system for automated state changes in an audio-output enabled device coupled to a headphone device, the headphone device including a right ear piece and a left ear piece, the system comprising:
    a processor in the audio-output enabled device, the processor configured to process digital audio data for output to the right earpiece and the left earpiece of the headphone device;
    sensors for detecting if the right earpiece and the left earpiece of the headphone device are each in an activated or deactivated state; and
    a control module configured for determining a device state change based on the activated or deactivated state of each earpiece and a current playback state of the audio-enabled device, the device state change including a playback state of the digital audio data.

2. The system of claim 1 wherein the sensors comprise an amplifier configured to monitor impedance of each earpiece.

3. The system of claim 1 wherein the sensors are thermo sensors located within each earpiece of the headphone device.

4. The system of claim 1 wherein the sensors are circuitry located within each earpiece of the headphone device.

5. The system of claim 1 wherein the sensors generate a state change signal.

6. The system of claim 1 wherein the sensors are coupled to a sensor port configured to receive signals.

7. The system of claim 1 wherein the control module comprises presets for the state changes.

8. The system of claim 1 further comprising a touch sensitive user interface configured to allow a user to enter presets into the control module.

9. A method for automatically changing a state of an audio-output enabled device coupled to a headphone device, the headphone device including a right ear piece and a left earpiece, the method comprising:
    processing digital audio data for output to the right earpiece and the left earpiece of the headphone device;
    receiving activation state data for both the right earpiece and the left earpiece of the headphone device; and
    based on the received activation state data for each earpiece and a current state of the audio-output enabled device, implementing a device state change based on a preset if an activation state change occurred, the device state change including a playback state of the digital audio data.

10. The method of claim 9 wherein determining if an activation state change occurred comprises determining if an impedance change occurred in each earpiece.

11. The method of claim 9 further comprising customizing the preset via a touch sensitive user interface.

12. The method of claim 9 wherein the activation state data comprises impedance data.

13. The method of claim 9 wherein the activation state data comprises activation state signals received from the headphone device.

14. The method of claim 9 wherein the activation state data comprises activation state change signals received from the headphone device.

15. A computer readable storage medium having embodied thereon a program, the program being executable by a processor to perform a method for automatically changing a state of an audio-output enabled device coupled to a headphone device, the headphone device including a right earpiece and a left earpiece, the method comprising:
  processing digital audio data for output to the right earpiece and the left earpiece of the headphone device;
  receiving activation state data for both the right earpiece and the left earpiece of the headphone device; and
  based on the received activation state data for each earpiece and a current state of the audio-output enabled device, implementing a device state change based on a preset if an activation state change occurred, the device state change including a playback state of the digital audio data.

16. A method for automatically changing a state of an audio-output enabled device coupled to a headphone device, the headphone device including a right earpiece and a left earpiece, the method comprising:
  receiving activation state data from both the right earpiece and the left earpiece of the headphone device;
  determining an activation state for each earpiece of the headphone device; and
  implementing a device state change based on a preset according to the activation state of each earpiece and a current state of the audio-output enabled device, the device state change including a playback state of digital audio data stored on the audio-output enabled device.

17. A headphone device for use with a system for automated state changes in an audio-output enabled device, comprising:
  a right earpiece;
  a left earpiece; and
  a first sensor coupled to the right earpiece and a second sensor coupled to the left earpiece, each of the sensors configured to:
    determine an activation state of the right earpiece and the left earpiece;
    generate activation state data for changing the device state of the audio-output enabled device based on a current state of the device, the device state change including a playback state of digital audio data stored on the audio-output enabled device.

18. The headphone device of claim 17 wherein at least one sensor is a thermo sensor.

19. The headphone device of claim 17 further comprising a micro-switch in the right and left earpieces, the micro-switch closing upon activation of the right and left earpieces.

20. The system of claim 1, wherein the playback state is selected from a group consisting of play, stop, rewind, fast forward, and pause.

21. The method of claim 9, wherein the playback state is selected from a group consisting of play, stop, rewind, fast forward, and pause.

22. The computer-readable storage medium of claim 15, wherein the playback state is selected from a group consisting of play, stop, rewind, fast forward, and pause.

23. The method of claim 16, wherein the playback state is selected from a group consisting of play, stop, rewind, fast forward, and pause.

24. The headphone device of claim 17, wherein the playback state is selected from a group consisting of play, stop, rewind, fast forward, and pause.

* * * * *